Oct. 25, 1927.
K. E. PEILER
1,646,705
GATHERING POOL LEVEL REGULATOR
Filed Oct. 31, 1925
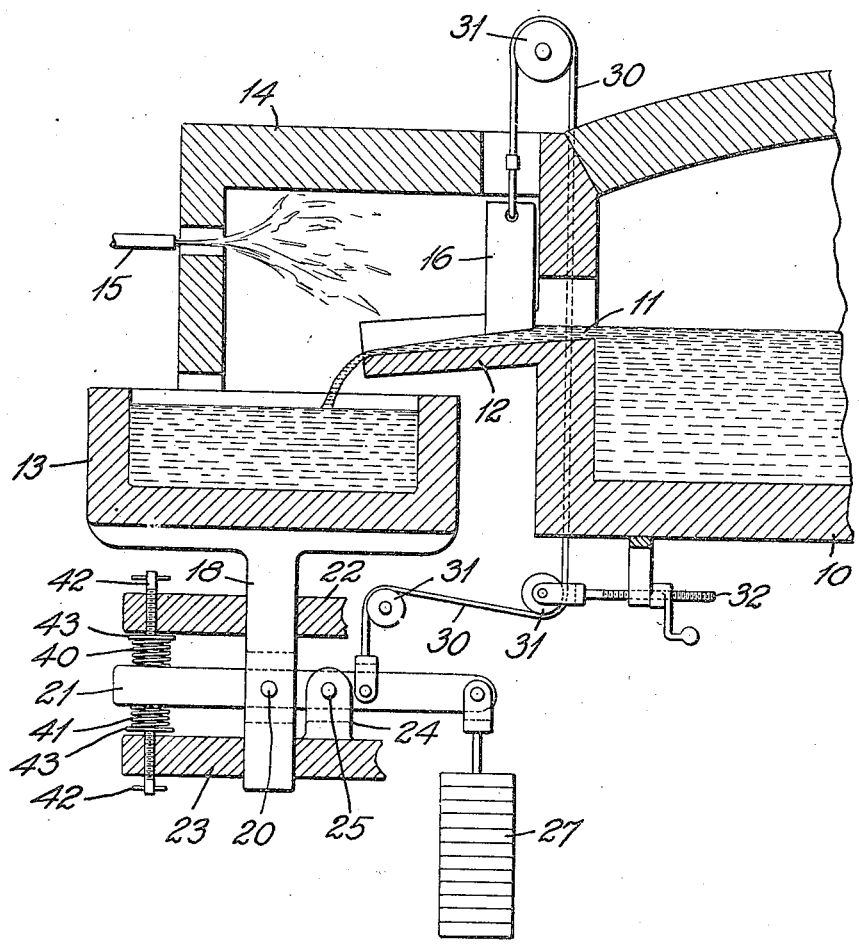
Inventor:
Karl E. Peiler
by Robson N. Brown
Att'y.

Patented Oct. 25, 1927.

1,646,705

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

GATHERING-POOL LEVEL REGULATOR.

Application filed October 31, 1925. Serial No. 66,018.

My invention relates to glass melting furnaces, and particularly to that type of furnace in which molten glass is supplied from a melting tank to a gathering pool from which the glass is removed by suction molds or by other gathering devices.

The object of my invention is to provide a regulator for a gathering pool which shall maintain the molten glass in the pool at a substantially constant level. This object is accomplished by mounting the pool container in such a manner that any change in the weight of the container and its contents, which may be caused by fluctuations in the amount of glass in the container, produces a corresponding change in the rate at which the glass is supplied to the pool from the melting tank.

As specifically shown herein, the gathering pool container is mounted for vertical movement and is counterbalanced by a weight which balances the container and its normal contents of glass. The flow of glass from the tank to the pool is controlled by a gate, and the gate and the pool container are connected to move together, in such a way that, whenever the pool container descends by reason of the accumulation of excess glass therein, the gate will also descend, thus reducing or stopping the flow of glass to the pool. Whenever the pool container rises, because of insufficient glass supply from the tank to replace the glass being gathered, the gate rises correspondingly and increases the flow of glass to the pool. Springs or other suitable means are provided for retarding the movement of the pool container, so that the regulating movements take place gradually and without shock.

The single figure of the accompanying drawing is a diagrammatic vertical sectional view showing the essential parts of apparatus constructed in accordance with my invention.

In the drawing, the numeral 10 indicates a glass melting tank provided with an outlet 11 and with a spout 12 which is adapted to deliver molten glass to a gathering pool container 13 associated with the tank. The spout and a portion of the gathering pool are partially enclosed by a hood 14. The hood may form an integral part of the furnace and is provided with a heating burner 15, which aids in maintaining the glass in the pool at the desired consistency for gathering. The flow of glass from the outlet 11 in the tank is controlled by a movable gate 16 actuated automatically, in response to movements of the gathering pool container 13, through the connections to be described below.

The container 13 is mounted on a vertically movable standard 18 which is pivotally mounted at 20 on a lever support 21. The standard 18 is guided in its vertical movement by frame or bearing members 22 and 23. The container is shown as a non-rotating structure, but it is obvious that my invention may be applied with equal facility in constructions where a rotating gathering pool is desired. The lever 21 is pivotally mounted at 25 on a U-shaped bracket 24, which serves as a fulcrum for the lever support 21. The support 21 carries at one end a weight 27 which may be composed of a plurality of weight units sufficient in number to counterbalance the weight of the container 13 and its contents of molten glass when the glass in the container 13 is at the desired level.

The gate 16 is connected to the support 21 by means of a flexible cord 30, guided by conveniently located pulleys. It will be observed that this connection causes the gate 16 to rise when the container 13 rises, and to descend when the container 13 descends. If desired, the gate may be connected to the support 21 through suitable link mechanism instead of through the flexible connector herein shown.

The rate at which glass is normally discharged from the spout 12 may be regulated by a hand operated screw device which carries one of the pulleys 31. By changing the horizontal position of this pulley, the relation between the support 21 and the gate 16 is varied to set the gate for normal operation.

In order to retard the vertical movements of the container 13 so that the automatic adjustments of the container and of the gate will take place gradually and without shock, I provide springs 40 and 41, which engage above and below the support 21 and are confined between the support 21 and any convenient stationary parts, such as the frame members 22 and 23. The compression of these springs may be regulated by means of hand screws 42 which transmit pressure to the springs 40 and 41 through plates 43.

Other resilient means, such as dash pots or the like, may be used for retarding the movements of the parts instead of the springs 40 and 41.

Under normal operation of the apparatus described above, glass flows in a constant stream from the tank 10 under the gate 16 and into the container 13 at a rate determined by the initial setting of the gate through the screw device 32. The container and its contents of molten glass are balanced by the counterweight 27. Whenever the glass is removed from the container at a rate greater than the rate at which the glass flows into the container, the counterweight 27 raises the container and thus tends to restore the glass in the container to its normal level. At the same time, the lifting of the container acts through the connector 30 to raise the gate 16, thus increasing the rate at which glass flows into the container and tending still further to raise the effective level of the glass in the container. The reverse operations take place whenever the glass is gathered from the pool in the container 13 at a rate less than the rate at which the glass flows into the container. The accumulation of glass in the container raises the glass above its normal level, but this is corrected by the lowering of the container by reason of the increased weight of glass therein. The lowering of the container also lowers the gate 16 to a corresponding extent, thus reducing the flow of glass to the gathering pool.

In practice, the fluctuations of the glass level in the gathering pool are corrected before they become great enough to require much movement of the pool container or of the gate. The parts should be so proportioned and adjusted that the gate descends and shuts off the flow of glass entirely whenever the gathering of glass from the pool is stopped for any considerable time.

It will be understood that the structural details shown in the accompanying drawing are largely diagrammatic, and that this invention may be embodied in various other structures falling within the scope of the appended claims.

I claim:

1. The combination, with a glass melting tank having a discharge outlet, of a movable gathering pool container associated with the furnace and adapted to receive molten glass from the outlet, means for supplying glass to the pool, a hood projecting from said furnace and adapted to partially enclose the pool and the outlet, means operated by the container for regulating the supply of glass to the container, and heating means associated with the hood for conditioning the molten glass supplied to the container.

2. The combination, with a glass melting tank having a discharge outlet, of a separately mounted container into which the glass from said tank is discharged and from which glass is taken, of a gate for controlling the flow of glass to the container from said outlet, a movable support for said container, means operated by movement of said support for operating said gate, and means for adjusting the extent that the gate is opened at a given position of the container to regulate the flow of glass past the gate in accordance with the rate at which glass is removed from the container.

3. The combination, with a glass melting tank having a discharge outlet, of a container associated with the melting tank and vertically movable with respect thereto, means for discharging glass from the tank to the container, a gate actuated by movement of the container for regulating the rate of discharge from the tank, a weight for counterbalancing the weight of said container and its normal contents of molten glass, and resilient means for retarding the upward movements of said container.

4. The combination, with a glass melting tank having a discharge outlet, of a continer arranged to receive molten glass from said melting tank and vertically movable with respect thereto, a gate for regulating the discharge of glass from said tank to said container, a pivotally mounted support for said container, a counterweight carried by said support for counterbalancing the weight of said container and its normal contents of glass, a connection between said support and said gate for raising said gate when said container rises and for lowering said gate when said container descends, and springs above and below said pivoted support for retarding the vertical movements of said support and of said container.

Signed at Hartford, Conn., this 28th day of October, 1925.

KARL E. PEILER.